United States Patent [19]

Wooding

[11] 4,446,995
[45] May 8, 1984

[54] ULTRAHIGH VELOCITY WATER-COOLED COPPER TROUGH

[75] Inventor: Patrick J. Wooding, Moorestown, N.J.

[73] Assignee: Wooding, Indian Mills, N.J.

[21] Appl. No.: 311,045

[22] Filed: Oct. 13, 1981

[51] Int. Cl.³ .............................................. B22D 41/08
[52] U.S. Cl. .................................. 222/590; 222/592; 222/607; 266/270
[58] Field of Search ......................... 266/46, 241, 270; 164/303, 309, 316, 337; 222/592, 593, 606, 607, 591, 590; 373/76, 79

[56] References Cited

U.S. PATENT DOCUMENTS 2,225,660 12/1940 Rogers ............................ 222/593 X

FOREIGN PATENT DOCUMENTS 48-8363  3/1973  Japan ............................. 266/270
85432    2/1936  Sweden .......................... 222/592

Primary Examiner—David A. Scherbel
Attorney, Agent, or Firm—Duffield & Lehrer

[57] ABSTRACT

A trough for delivering molten material flowing from a furnace includes an elongated copper member along which the material flows. A coolant guide is located beneath the copper member and is closely spaced therefrom so as to define a highly restrictive narrow coolant flow passage. A liquid coolant is supplied to the passage where the velocity of the same is made to accelerate to an ultrahigh velocity of at least 10 feet per second across the undersurface of the copper member to thereby sweep away steam generated upon the surface.

5 Claims, 2 Drawing Figures

ULTRAHIGH VELOCITY WATER-COOLED COPPER TROUGH

BACKGROUND OF THE INVENTION

The present invention is directed toward a delivery trough for use with a melting furnace and more particularly toward an ultrahigh velocity water-cooled copper trough.

Troughs for delivery of molten material have been one of the banes of designers for years. Refractory construction is expensive and short-lived in air, builds up unpredictable accretions as the "system" attempts to reach thermal steady state and therefore corrupts an otherwise steady delivery into an unsteady, wavering flow. Essentially the same criticism applies to water-cooled metal troughs, particularly since these have invariably been made of carbon or stainless steel, cooled in a conventional manner. To date, no one has been able to produce a trough capable of providing a constant, unwavering flow of material from the discharge end thereof.

As explained more fully in Applicant's U.S. Pat. No. 4,032,705 (the entire subject matter thereof being included herein by reference), Applicant has discovered that the rapid, consistent removal of large quantities of energy (in the range of 1 BTU per square inch per second) through a water-cooled metal barrier, without damage to the barrier, requires that the metal have excellent thermal conductivity and a reasonably high melting point, and be force-cooled at a constant temperature by the creation and efficient removal of steam at its back face.

Converting 1 pound of water into steam requires 967 BTU's of heat at 212° F. (or 536 calories per gram at 100° C.). If water can be made to present itself consistently to the area to be cooled and there to turn into steam, and then to leave the area immediately to make room for more water to arrive, a highly efficient and predictable cooling system results. The area to be cooled must, of course, be kept free of accretion to obviate the film effects which are adverse to efficient thermal transfer.

Experimentation has shown that the best way to remove the steam film as rapidly as it forms is by applying ultrahigh velocity cooling water to the back surface of the metal barrier. A cooling water velocity of at least 10 feet per second has proved to be required, and this velocity must be at the suface of the metal, not merely at the center of a substantial cooling passage of which the metal barrier is one of the walls. The preferred water cooling velocity is at least 20 feet per second. It should be readily apparent that such velocities require high flow rates through small passages, thereby generating pressure drops of the order of 20 to 60 psi, depending on the surfaces, shapes and length of the area to be cooled.

To enhance the effectiveness of this cooling, a readily workable metal of reasonable cost and melting point and high thermal conductivity is required. From a table of the physical properties of the elements, a selection of an easily workable, relatively inexpensive material with a melting point above 1,000° C. and good thermal transfer capability results in the following list:

| ELEMENT | MELTING POINT (°C.) | CONDUCTIVITY (calgmcm/sqcm/sec/°C.) |
|---|---|---|
| Chromium (Cr) | 1875 | 0.16 |
| Copper (Cu) | 1083 | 0.943 |
| Iron (Fe) | 1537 | 0.18 |
| Molybdenum (Mo) | 2610 | 0.34 |
| Nickel (Ni) | 1453 | 0.22 |
| Silver (Ag) | 960 | 1.00 (for comparison) |

Chromium, molybdenum and nickel are not really easily workable and they are relatively expensive. Furthermore, these materials have thermal conductivities which are from 3 to 5 times poorer than that of copper.

Because of the relatively low melting point of copper and the corresponding higher melting point of iron, the automatic and quite incorrect choice in the past for a water-cooled trough has been steel. This has been true even though it has a thermal transfer ability less than 1/5 that of copper. Furthermore, for a number of reasons, the water-cooled steel has a tendency to form films thereon of a highly insulating nature.

Compounding this technical felony is the fact that, to Applicant's knowledge, no attempt has been made to ensure the efficient removal of heat energy from the back face of a trough by the encouragement of steam formation, against a clean surface, made effective by the immediate removal of that steam by new cooling water moving at "ultrahigh velocity." It should be pointed out that the use of stainless steel only makes matters worse since stainless steel grades have thermal transfer abilities 16 to 24 times poorer than copper.

SUMMARY OF THE INVENTION

The present invention overcomes the problems of the prior art and results in a trough which is protected from wear and which provides a predictable, consistent contour of solidified material or "skull," thereby saving considerable in-service fettling of such troughs and which improves the process by permitting a constant, unwavering flow of material from the discharge end of the trough. This is accomplished in accordance with the present invention by a trough which includes an elongated copper member along which the material flows. A coolant guide is located beneath the copper member and is closely spaced therefrom so as to define a highly restrictive narrow coolant flow passage. A liquid coolant is supplied to the passage where the velocity of the same is made to accelerate to an ultrahigh velocity of at least 10 feet per second across the undersurface of the copper member to thereby sweep away steam generated upon the surface.

BRIEF DESCRIPTION OF THE DRAWING

For the purpose of illustrating the invention, there is shown in the accompanying drawing one form which is presently preferred; it being understood that the invention is not intended to be limited to the precise arrangements and instrumentalities shown.

DETAILED DESCRIPTION OF THE PREFERRED EMBODIMENT

Figure 1:
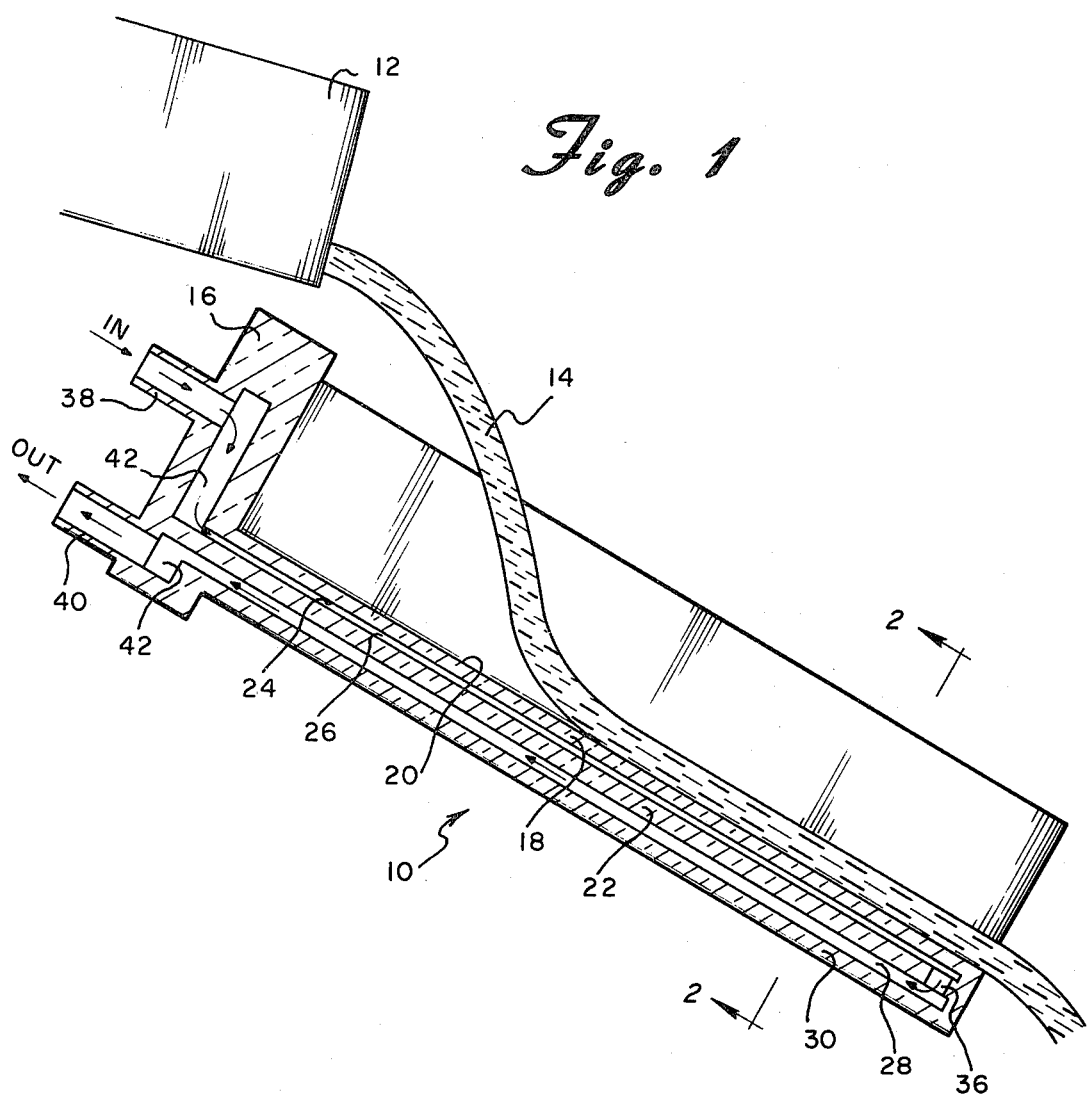
FIG. 1 is a lengthwise cross-sectional view of an ultrahigh velocity water-cooled copper trough constructed in accordance with the principles of the present invention.

Referring now to the drawing in detail wherein like reference numerals have been used in the two figures to designate like elements, there is shown in FIG. 1 a lengthwise cross-sectional view of an ultrahigh velocity water-cooled copper trough constructed in accordance with the principles of the present invention and designated generally as 10. Trough 10 is shown located beneath a taphole 12 of a melting furnace so that molten material such as molten slag 14 flowing from the taphole 12 may be guided along the upper surface of the trough to a spinning station or to any other desired location.

Figure 2:
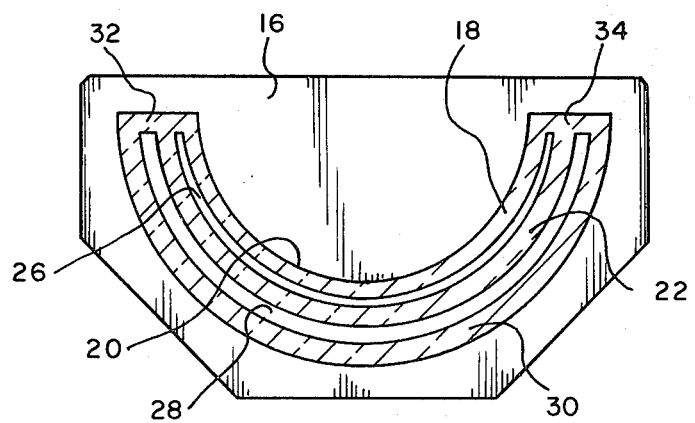
FIG. 2 is a cross-sectional view taken along the lines 2—2 of FIG. 1.

Except for the end wall 16, the entire trough 10 is substantially semicylindrically shaped as is shown most clearly in FIG. 2. The trough is comprised of an elongated substantially semicylindrically shaped upper copper member 18 having an upper working surface 20 which supports the molten material 14. A complementary shaped coolant guide 22 is mounted below the lower surface 24 of the copper member 18 and is closely spaced therefrom defining a highly restrictive narrow flow passage 26. The flow passage 26 extends substantially the entire length of the trough 10.

Located beneath the coolant guide 22 and spaced therefrom so as to define a return path or space 28 is a lower jacket 30. The shape of the jacket 30 is substantially the same as the shape of the upper copper member 18 and the coolant guide 22. As shown most clearly in FIG. 2, the extreme side edges of the members 18, 22 and 30 are sealed together such as shown at 32 and 34. A plurality of holes 36, however, are formed in the coolant guide adjacent the discharge end of the trough 10 (the right side as viewed in FIG. 1) so as to provide communication between the passage 26 and the return path 28.

The end wall 16 of the trough 10 includes an inlet port 38 and an outlet port 40. Inlet port 38 is in communication with a channel 42 which extends substantially the width of the trough and which communicates with the passage 26. Similarly, the output port 40 is in communication with channel 42 which, in turn, communicates with the return path 28.

The trough 10 functions in the following manner. Molten material such as molten slag 14, for example, flows from the furnace through taphole 12 onto the working surface 20 of the copper member 18 and thence to a spinner or the like. As the molten slag 14 flows along the surface 20, intense heat is transferred to the copper member 18. Water or other desired liquid coolant is forced into the inlet portion 38, through the channel 42 and into the passage 26. From there, the liquid coolant passes through the openings 36 and back up through the return path 28 to channel 42 and out the outlet port 40. Because of the highly restrictive narrow flow passage 26 in combination with the pressure of the incoming liquid coolant, the coolant is forced across the undersurface 24 of the copper member 18 at an ultrahigh velocity of at least 10 feet per second to sweep away steam generated upon this surface, thereby effectively cooling the copper member 18.

As a result of the effective cooling provided by the present invention, a skin or "skull" of solid slag material of predictable, constant thickness freezes on the working surface of the trough thereby permitting a constant, unwavering flow of material from the discharge end of the trough. Furthermore, this skull is thermally insulating thereby protecting the copper from excessive temperatures. The skull also protects the copper working surface from physical wear.

It should be noted that while port 38 has been referred to as the inlet port and port 40 as the outlet port, these can be reversed. The liquid coolant can be made to flow in the opposite direction entering the port 40 and leaving the port 38 with the same cooling effect. Furthermore, it should be pointed out that the coolant guide 22, jacket 30 and end wall 16 may also be made from copper or may be made from stainless steel or any other desired material.

The present invention may be embodied in other specific forms without departing from the spirit or essential attributes thereof and accordingly, reference should be made to the appended claims rather than to the foregoing specification as indicating the scope of the invention.

I claim:

1. A trough for delivering molten material flowing from a furnace comprising:
    an elongated upper member having an upper surface for supporting said material and an elongated lower surface;
    a coolant guide having a shape complementary to said upper member and being closely spaced from the lower surface thereof defining a highly restrictive narrow flow passage which extends substantially the entire length of said lower surface; and
    liquid coolant supply means in communication with said passage for supplying coolant thereto whereby the velocity of the coolant will be accelerated to an ultrahigh velocity across and against the lower surface of said member as it passes through the passage to thereby sweep away steam generated upon said lower surface.

2. The trough as claimed in claim 1 further including a lower member complementary to said coolant guide and being spaced from the bottom thereof to provide a return path for said liquid coolant, a plurality of transfer ports adjacent one end of the trough providing communication from said passage to said return path.

3. The trough as claimed in claim 1 wherein said upper member is comprised of copper.

4. A method for effectively cooling a trough utilized for delivering molten material flowing from a furnace and which includes an elongated upper surface for supporting said material, an elongated lower surface and a coolant guide having a shape complementary to said upper surface and being closely spaced from the lower surface thereof defining a highly restrictive narrow flow passage which extends substantially the entire length of said lower surface comprising the step of passing liquid coolant through said highly restrictive narrow flow passage thereby directing said liquid coolant across and against the lower surface at an ultrahigh velocity of at least 10 feet per second to sweep away steam generated upon said lower surface.

5. The method as claimed in claim 4 wherein the liquid coolant is directed across the lower surface of said trough while molten material from a furnace flows across the upper supporting surface of said trough and further including the step of allowing part of said molten material to freeze on said working surface to a film of solid material of substantially constant thickness.

* * * * *